United States Patent
Kim et al.

(10) Patent No.: US 8,313,401 B2
(45) Date of Patent: Nov. 20, 2012

(54) TRANSMISSION FOR HYBRID VEHICLE

(75) Inventors: Baekyu Kim, Gyeonggi-Do (KR);
Kyungha Kim, Gyeonggi-Do (KR);
Talchol Kim, Incheon (KR); Heera Lee,
Gyeonggi-Do (KR); Youngchul Kim,
Gyeonggi-Do (KR); Yeonho Kim,
Gyeonggi-Do (KR); Jaeshin Yi,
Gyeonggi-Do (KR); Wansoo Kim,
Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 138 days.

(21) Appl. No.: 12/768,849

(22) Filed: Apr. 28, 2010

(65) Prior Publication Data
US 2011/0111906 A1    May 12, 2011

(30) Foreign Application Priority Data
Nov. 9, 2009  (KR) .................. 10-2009-0107472

(51) Int. Cl.
*F16H 3/72* (2006.01)
*F16H 37/06* (2006.01)
(52) U.S. Cl. ......................................... 475/5
(58) Field of Classification Search ....... 475/5, 269–330
See application file for complete search history.

(56) References Cited

U.S. PATENT DOCUMENTS

| | | | | |
|---|---|---|---|---|
| 7,169,074 B2* | 1/2007 | Raghavan et al. | ............. | 475/5 |
| 7,192,373 B2* | 3/2007 | Bucknor et al. | ............. | 475/5 |
| 7,220,201 B2* | 5/2007 | Raghavan et al. | ............. | 475/5 |
| 7,220,202 B2* | 5/2007 | Singh et al. | ............. | 475/5 |
| 7,232,393 B2* | 6/2007 | Bucknor et al. | ............. | 475/5 |
| 7,252,611 B2* | 8/2007 | Raghavan et al. | ............. | 475/5 |
| 7,252,612 B2* | 8/2007 | Bucknor et al. | ............. | 475/5 |
| 7,261,658 B2* | 8/2007 | Bucknor et al. | ............. | 475/5 |
| 7,261,659 B2* | 8/2007 | Raghavan et al. | ............. | 475/5 |
| 7,273,435 B2* | 9/2007 | Raghavan et al. | ............. | 475/151 |
| 7,288,041 B2* | 10/2007 | Bucknor et al. | ............. | 475/151 |
| 7,300,374 B2* | 11/2007 | Bucknor et al. | ............. | 475/5 |
| 7,367,911 B2* | 5/2008 | Raghavan et al. | ............. | 180/65.25 |
| 7,422,535 B2* | 9/2008 | Raghavan et al. | ............. | 475/5 |
| 7,473,199 B2* | 1/2009 | Bucknor et al. | ............. | 475/5 |
| 7,479,080 B2* | 1/2009 | Usoro | ............. | 475/5 |
| 7,481,733 B2* | 1/2009 | Cho et al. | ............. | 475/5 |
| 7,488,269 B2* | 2/2009 | Tabata et al. | ............. | 475/286 |
| 7,691,021 B2* | 4/2010 | Cho et al. | ............. | 475/5 |
| 7,717,817 B2* | 5/2010 | Raghavan et al. | ............. | 475/5 |
| 7,967,711 B2* | 6/2011 | Conlon et al. | ............. | 475/5 |
| 7,998,016 B2* | 8/2011 | Si et al. | ............. | 475/284 |
| 2008/0207374 A1* | 8/2008 | Iwanaka et al. | ............. | 475/5 |
| 2009/0312129 A1* | 12/2009 | Park et al. | ............. | 475/5 |
| 2010/0081533 A1* | 4/2010 | Lee et al. | ............. | 475/5 |
| 2010/0179009 A1* | 7/2010 | Wittkopp et al. | ............. | 475/5 |
| 2011/0053724 A1* | 3/2011 | Phillips | ............. | 475/5 |
| 2011/0086737 A1* | 4/2011 | Phillips | ............. | 475/5 |

FOREIGN PATENT DOCUMENTS

| | | |
|---|---|---|
| JP | 2005-029027 A | 2/2005 |
| JP | 2005-112019 A | 4/2005 |

(Continued)

*Primary Examiner* — Troy Chambers
*Assistant Examiner* — Michael Gonzalez
(74) *Attorney, Agent, or Firm* — Edwards Wildman Palmer LLP; Peter F. Corless

(57) ABSTRACT

The transmissions for a hybrid vehicle according to the present invention provide multiple electric vehicle modes, multiple power split modes, and multiple fixed-gear ratio modes, thereby increasing driving performance and fuel efficiency.

5 Claims, 13 Drawing Sheets

FOREIGN PATENT DOCUMENTS

| | | |
|---|---|---|
| JP | 2006-077859 A | 3/2006 |
| JP | 2006-282069 A | 10/2006 |
| JP | 2008-120138 A | 5/2008 |
| KR | 10-2007-0110552 | 11/2007 |
| KR | 10-2008-0027638 A | 3/2008 |
| WO | 2007/061511 A2 | 5/2007 |

* cited by examiner

FIG.6

| MODE | | CL1 | CL2 | BK1 | BK2 |
|---|---|---|---|---|---|
| EV MODE | EV 1 | | | ● | |
| | EV 2 | ● | | ● | |
| POWER SPLIT MODE | INPUT SPLIT | | | ● | |
| | COMPOUND SPLIT | ● | | | |
| FIXED GEARS | UD | ● | ● | ● | |
| | 1:1 | ● | ● | | |
| | OD | ● | | | ● |

TRANSMISSION FOR HYBRID VEHICLE

CROSS-REFERENCE TO RELATED APPLICATIONS

The present application claims priority to Korean Patent Application Number 10-2009-0107472 filed Nov. 9, 2009, the entire contents of which application is incorporated herein for all purposes by this reference.

BACKGROUND

1. Technical Field

The present invention relates a transmission for a hybrid vehicle, in more detail, a transmission for a hybrid vehicle having a plurality of power split modes and a plurality of fixed-gear ratio shift stages.

2. Related Art

A hybrid vehicle equipped with a hybrid transmission formed by assembly of an engine, one or more motor generators, and one or more planetary gear sets can travel in an electric vehicle mode in which the power from the motor generator(s) is used to get the vehicle started or operate the vehicle at a low velocity and in a power split mode in which the power from the engine and the power from the motor generator(s) are used with a transmission (e.g., Electrically Variable Transmission (EVT)) when the velocity of the vehicle increases. In some cases, a fixed-stage gear ratio can be used to improve power performance of the vehicle. Advantages of such a hybrid vehicle include high fuel efficiency and low emission.

Researches have been made to provide a new transmission that can contribute improve fuel efficiency with higher operation performance. There is, however, still need for an improved transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a power transmission for a hybrid vehicle that can implement two or more electric vehicle modes, which are the basic driving modes of a hybrid vehicle, with a simple configuration, two or more power split modes of hybrid modes by functioning as an EVT, a plurality of fixed-gear ratio modes driven at a fixed-gear ratio, similar to the shift stage of general transmissions by power of an engine while operating motor generators to selectively supply power or generate electricity. Therefore, it is possible to implement high-efficiency driving in accordance with traveling conditions of a vehicle, and improve fuel efficiency of the vehicle while achieving a power train for a vehicle at a low cost.

An aspect of the prevent invention provides a transmission for a hybrid vehicle including: a first differential gear set that includes first, second, and third members; a second differential gear set that includes first, second, and third members, the first member of the second differential gear set being continuously connected to the first member of the first differential gear set; a first torque transmission unit that can selectively connect the second member of the first differential gear set with the third member of the second differential gear set; a second torque transmission unit that can restrict the rotation of the third member of the second differential gear set; a first motor generator that is connected to the third member of the first differential gear set; and a second motor generator that is connected to the first member of the second differential gear set, wherein the second member of the first differential gear set is connected to an engine, and the second member of the second differential gear set is connected to an output unit.

Another aspect of the present invention provides a transmission for a hybrid vehicle including: a first differential gear set that includes a plurality of members, one of the members being connected to an engine; a second differential gear set that includes a plurality of members, one of the members being continuously connected to one of the members of the first differential gear set other than the member of the first differential gear set connected to the engine and another one of the members being connected to an output unit; a first torque transmission unit that can selectively connect the member of the first differential gear set connected to the engine with one of the members of the second differential gear set other than the member that is continuously connected to one of the members of the first differential gear set and the member that is connected to the output unit; a second torque transmission unit that can restrict the rotation of the member of the second differential gear set connected to the first torque transmission unit; a first motor generator that is continuously connected to one of the members of the first differential gear set; and a second motor generator that is continuously connected to one of the members of the second differential gear set.

The transmissions according to the present invention can implement two or more electric vehicle modes, which are the basic driving modes of a hybrid vehicle, with a simple configuration, two or more power split modes of hybrid modes by functioning as an EVT, two or more fixed-gear ratio modes, similar to the shift stage of general transmissions by power of an engine while operating motor generators to selectively supply power or generate electricity. Therefore, it is possible to implement high-efficiency driving in accordance with traveling conditions of a vehicle and improve fuel efficiency of the vehicle while achieving a power train for a vehicle at a low cost.

The above and other features and advantages of the present invention will be apparent from or are set forth in more detail in the accompanying drawings, which are incorporated in and form a part of this specification, and the following Detailed Description, which together serve to explain by way of example the principles of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 6 is a table showing the operation modes implemented by the transmission according to the third embodiment.

DETAILED DESCRIPTION

Figure 1:
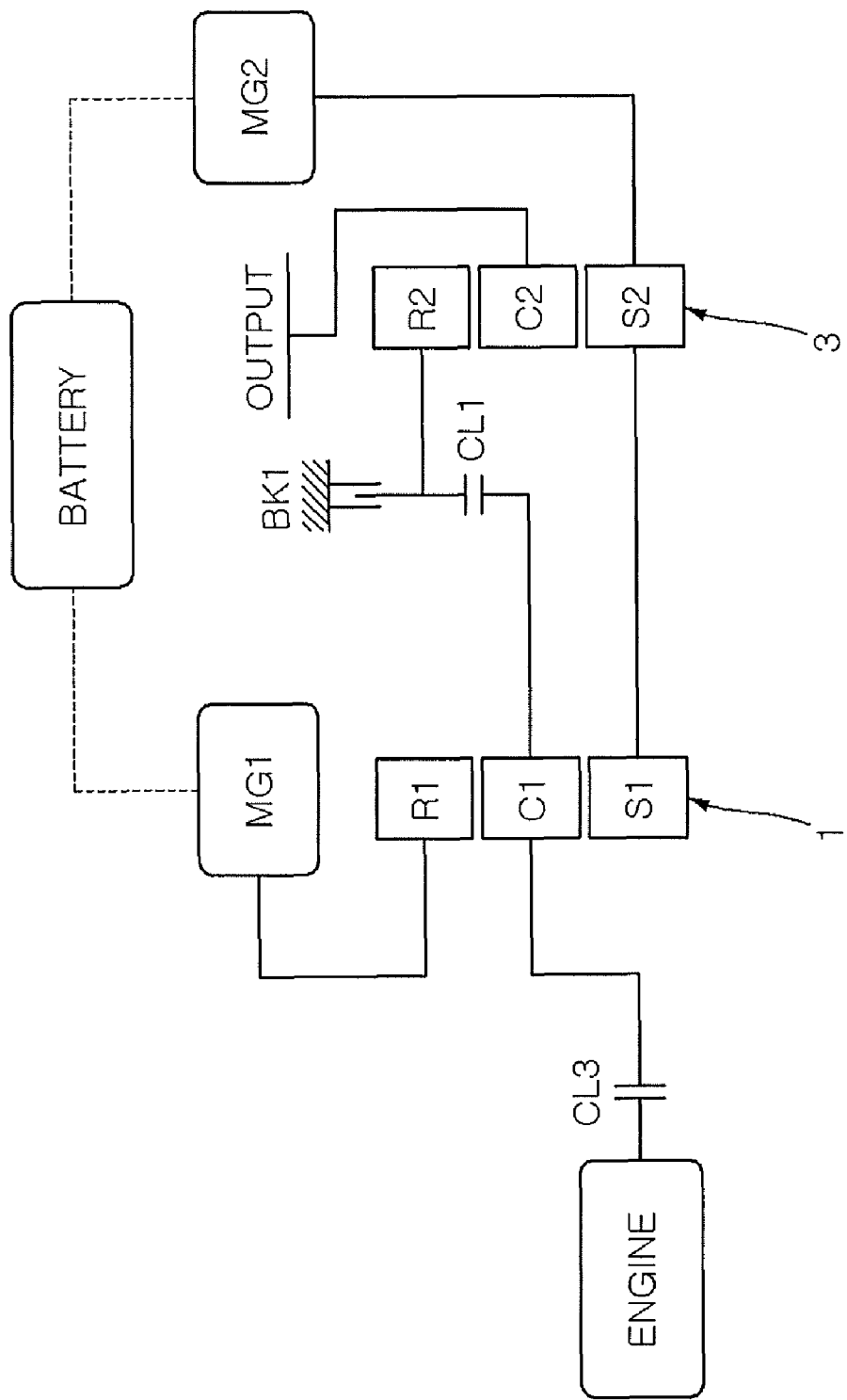
FIGS. 1-5 are diagrams illustrating the configuration of transmissions for a hybrid vehicle according to a first, a second, a third, a fourth, and a fifth embodiments of the present invention, respectively.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIGS. 1-5 are diagrams illustrating the configuration of transmissions for a hybrid vehicle according to a first, a second, a third, a fourth, and a fifth embodiments of the present invention, respectively.

The transmissions according to the embodiments include a first differential gear set 1, a second differential gear set 3, a first torque transmission unit, a second torque transmission unit, a first motor generator MG1, and a second motor generator MG2.

The first differential gear set 1 and the second differential gear set 3 each include a plurality of members. One of the members of the first differential gear set 1 is connected to an engine (ENGINE). One of the members of the second differential gear set 3 is continuously connected to another member of the first differential gear set 1. Another member of the second differential gear set 3 is connected to an output unit (OUTPUT). The member of the first differential gear set 1 connected to the ENGINE is selectively connected by the first torque transmission unit with at least one of the members of the second differential gear set 3 other than the above-described members that are continuously connected to another member of the first differential gear and connected to the OUTPUT. The second torque transmission unit is disposed to restrict the rotation of the member or members of the second differential gear set 3 connected to the first torque transmission unit.

The first motor generator MG1 is continuously connected to one of the members of the first differential gear set 1 and the second motor generator MG2 is continuously connected to one of the members of the second differential gear set 3. Preferably, the first motor generator MG1 is connected to the member of the first differential gear set 1 other than the members that are connected to the ENGINE and continuously connected to the second differential gear set 3 and the second motor generator MG2 is continuously connected to the member of the second differential gear set 3 that is continuously connected to the member of first differential gear set 1.

Preferably, the first differential gear set 1 and the second differential gear set 3 each may be implemented by suitable planetary gear sets. The first differential gear set 1 and the second differential gear set 3 each may include a first member, a second member, and a third member. Suitably, the first, second, and third members of the first differential gear set 1 may be a first sun gear S1, a first carrier C1, and a first ring gear R1, respectively. Suitably, the first, second, and third members of the second differential gear set 3 may be a second sun gear S2, a second carrier C2, and a second ring gear R2.

Alternatively, first differential gear set 1 and second differential gear set 3 may be implemented by other gear sets using other gears, such as a bevel gear, as well as the planetary gear set such that the rotational speed of any one gear becomes at least the weighted average speed of other two gears.

In the transmission according to the first embodiment of the present invention shown in FIG. 1, a fifth torque transmission unit is further provided to selectively connect a member of the first differential gear set 1 with the ENGINE.

In this embodiment, the first differential gear set 1 and the second differential gear set 3 are both simple planetary gear sets. The first torque transmission unit and the fifth torque transmission unit are a first clutch CL1 and a third clutch CL3, respectively, which can connect/disconnect two members that can rotate with respect to each other, and the second torque transmission unit is a first brake BK1 which can restrict the rotation of connected members. The first sun gear S1 is continuously connected to the second sun gear S2, the first carrier C1 is connected to the second ring gear R2 through the first clutch CL1 and to the ENGINE through the third clutch CL3, the first ring gear R1 is continuously connected to the first motor generator MG1, the second sun gear S2 is continuously connected to the second motor generator MG2, and the second carrier C2 is connected to the OUTPUT. The first brake BK1 is disposed to be able to restrict the rotation of the second ring gear R2.

Figure 2:
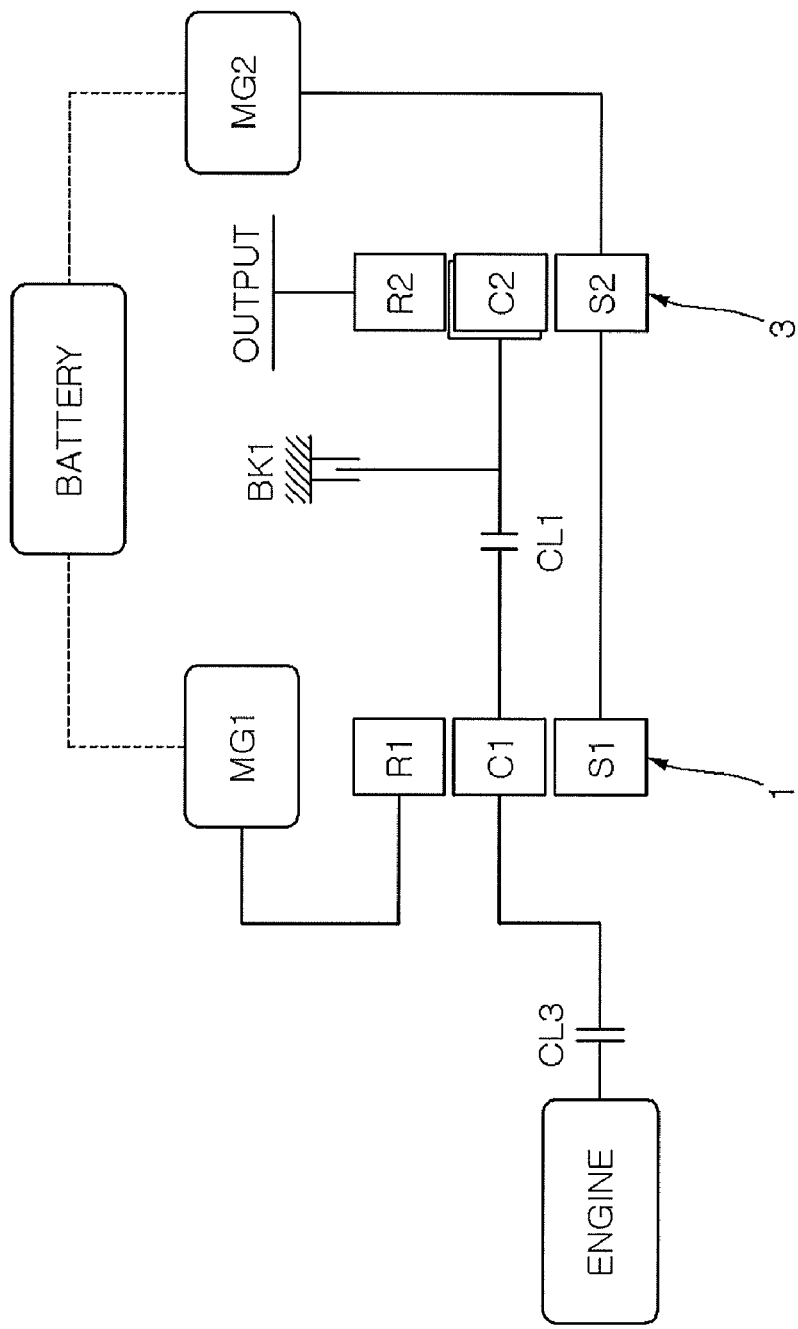

The transmission according to the second embodiment shown in FIG. 2 has the same configuration as that of the first embodiment shown in FIG. 1, except that the second differential gear set 3 is a compound planetary gear set, the first carrier C1 is connected to the second carrier C2 through the first clutch CL1, and the second ring gear R2 is connected to the OUTPUT.

Figure 3:
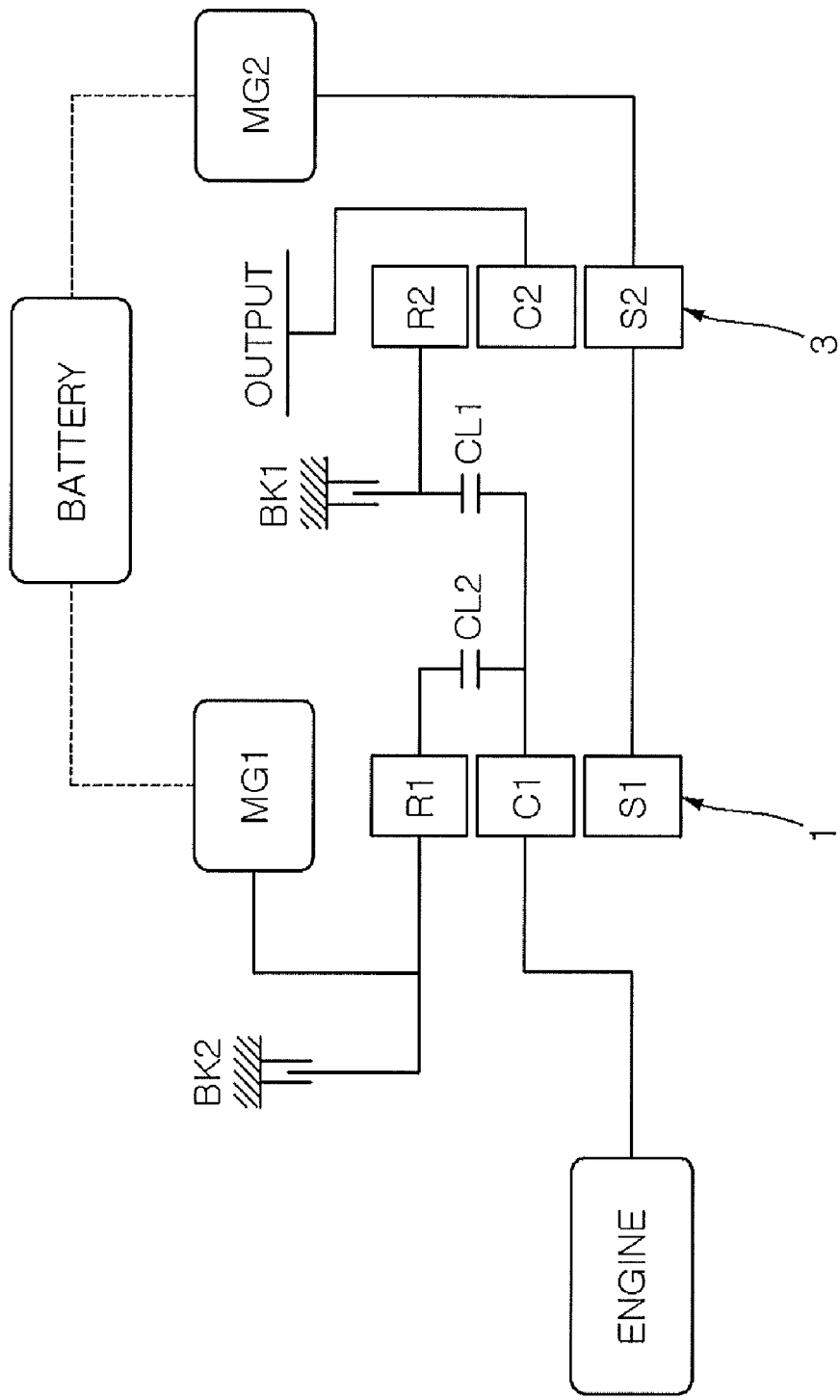

The transmission according to the third embodiment shown in FIG. 3 has the same configuration as that of the first embodiment, except that it does not include the fifth torque transmission member and it includes a third torque transmission unit and a fourth torque transmission unit. The third torque transmission unit may selectively connect the member of the first differential gear set 1 connected to the ENGINE with the member of the first differential gear set 1 connected to the first motor generator MG1. The fourth torque transmission unit may restrict the rotation of the member of the first differential gear set 1 connected to the first motor generator MG1. Preferably, the third torque transmission unit is a second clutch CL2 which can selectively connect/disconnect two members which can rotate with respect to each other and the fourth torque transmission unit is a second brake BK2 which can restrict the rotation of connected members. For instance, the second clutch CL2 is disposed to be able to selectively connect the first carrier C1 with the first ring gear R1 and the second brake BK2 is disposed to be able to restrict the rotation of the first ring gear R1.

Figure 4:
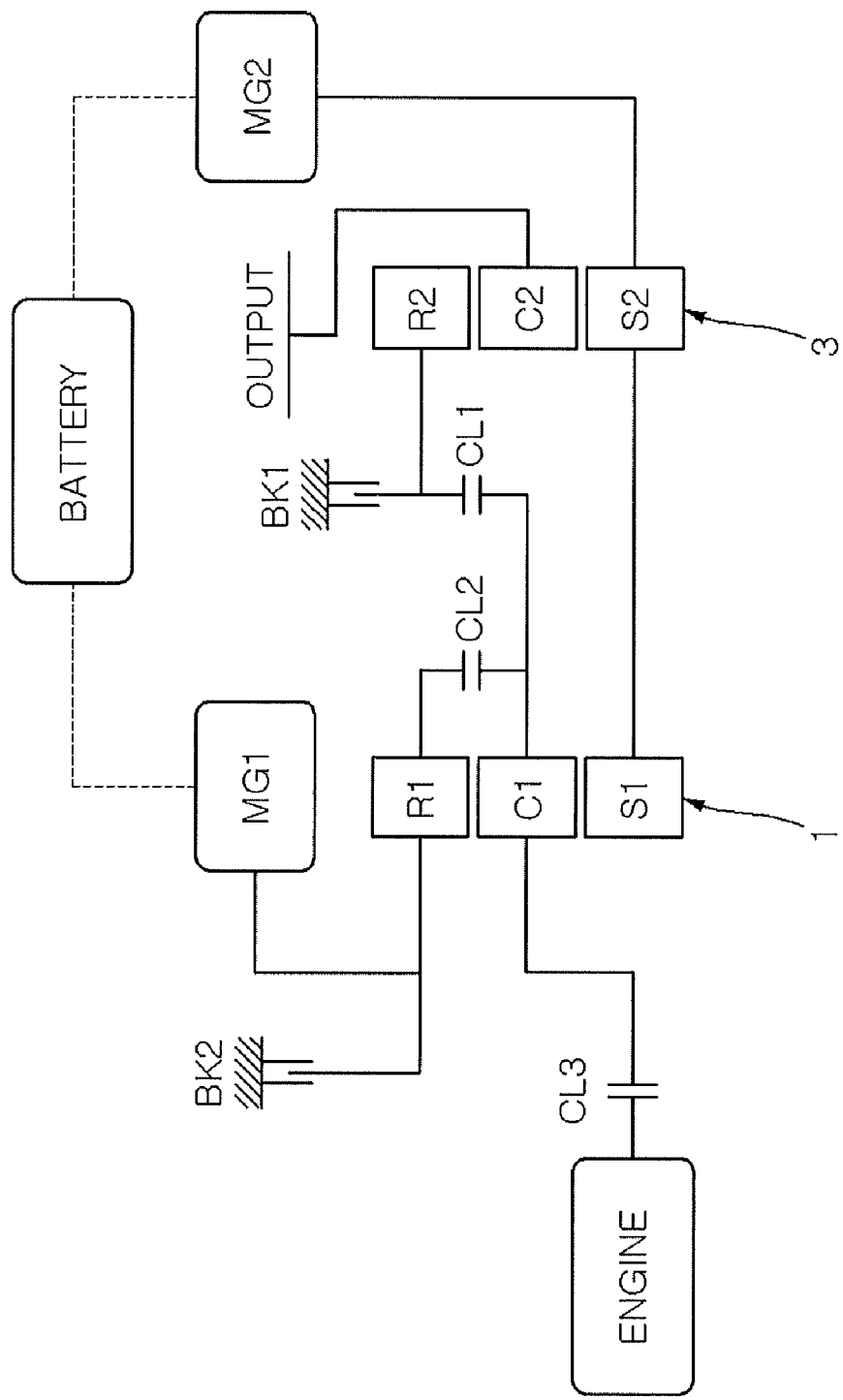
Figure 5:
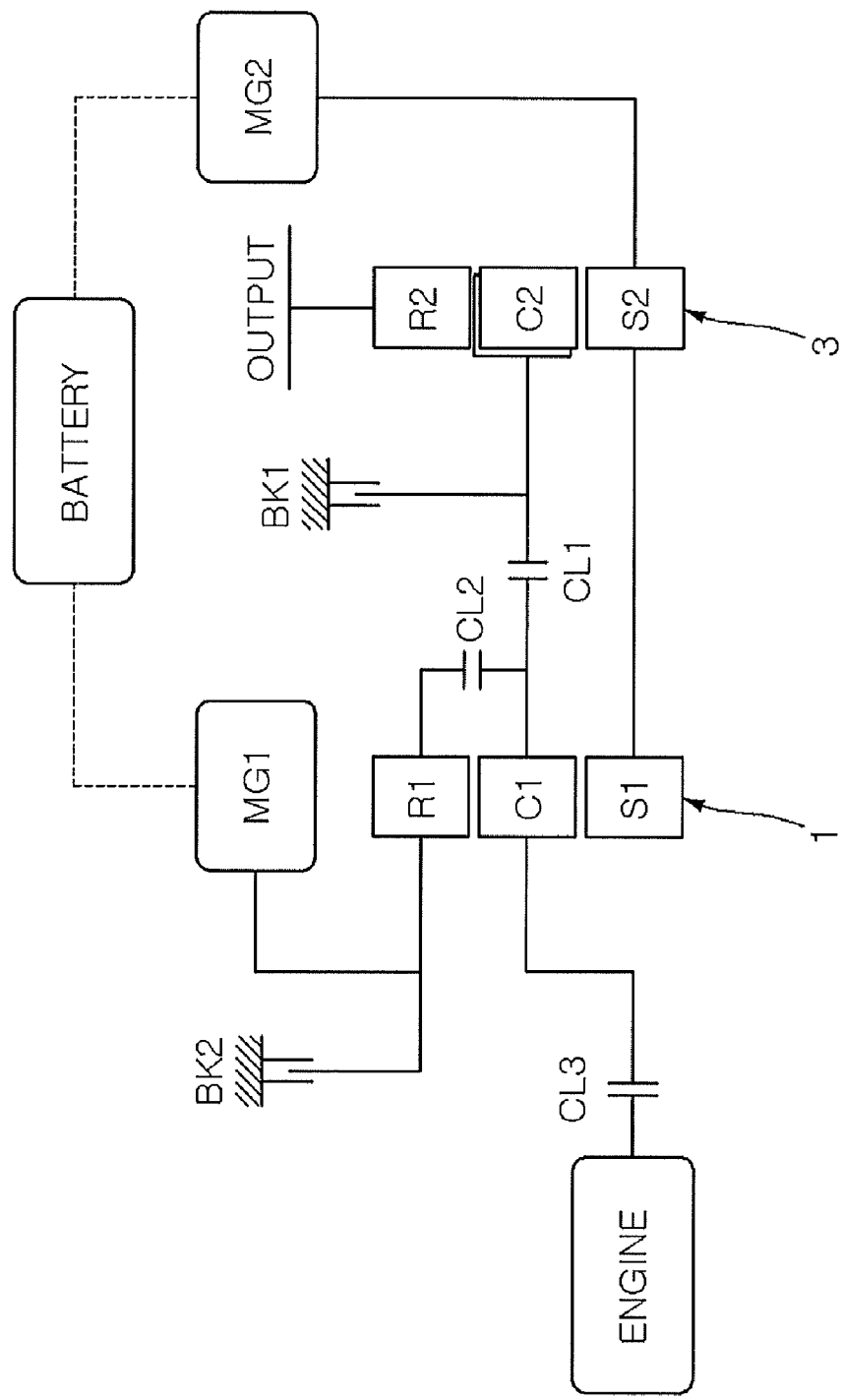

The transmission according to the fourth embodiment shown in FIG. 4 has the same configuration as that of the third embodiment, except that it further includes the fifth torque transmission member. For instance, it includes the third clutch CL3 between the first carrier C1 of the first differential gear set 1 and the ENGINE.

The transmission according to the fourth embodiment shown in FIG. 4 has the same configuration as that of the fourth embodiment, except that the second differential gear set 3 is a compound planetary gear set, such that the first carrier C1 is connected to the second carrier C2 through the first clutch CL1 and the second ring gear R2 is connected to the OUTPUT.

Hereinafter, the operation of the transmissions according to the present invention is described with reference to the third embodiment shown in FIG. 3. As the operation of the other embodiments is substantially similar to that of the third embodiment and solely for the simplicity, a detailed description of the operation of the transmissions according to the other embodiments is omitted.

FIG. 6 is a table that shows the operation modes of the transmission according to the third embodiment. As shown in the table, the transmission can provide two electric vehicle modes EV1 and EV2, two power split modes (i.e., an input split mode and a compound split mode), and three fixed-gear stage modes (i.e., an under-drive state (UD) mode, a 1:1 mode, and an over-drive state (OD) mode).

Figure 7:
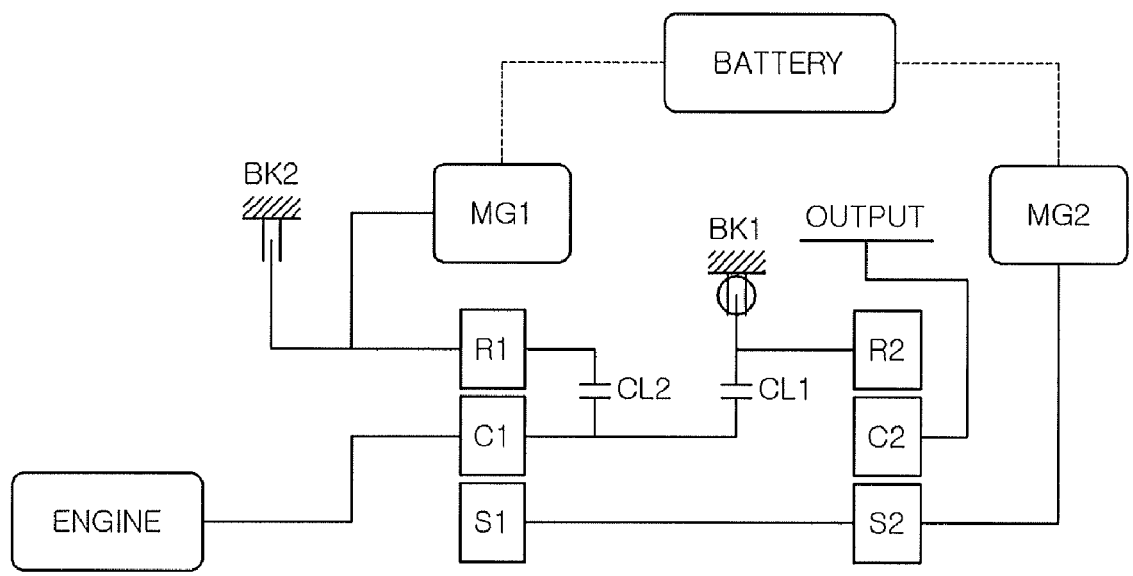
FIGS. 7 to 13 show diagrams of the configuration of the transmission according to the third embodiment in the respective operation modes with the respective lever diagrams corresponding thereto.
Figure 7:
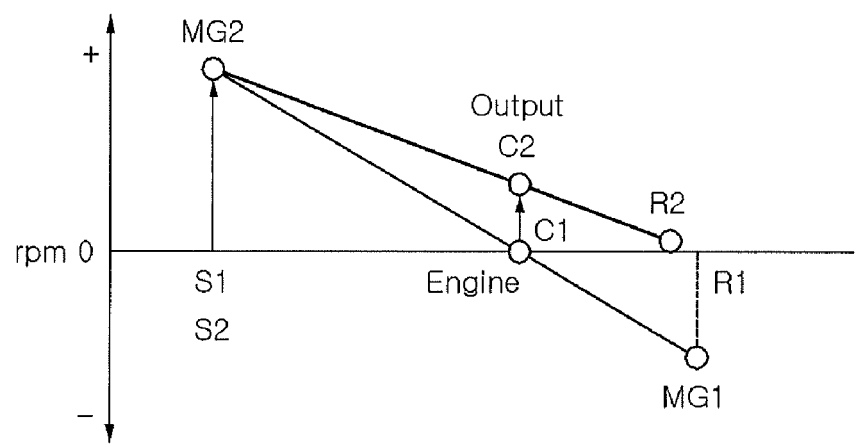

FIG. 7 shows the EV1 mode, which is implemented by engaging the first brake BK1, with the ENGINE stopped. The second ring gear R2 is fixed by the first brake BK1, such that as the second motor generator MG2 drives the second sun gear S2, the velocity is reduced by the second carrier C2 and outputted to the OUTPUT, and as a result, a drive wheel connected to the OUTPUT is driven. In this operation, since the first sun gear S1 is also driven by the second motor generator MG2 and the ENGINE is fixed, the first motor generator MG1 is freely rotated by the first ring gear R1 in the opposite direction.

Figure 8:
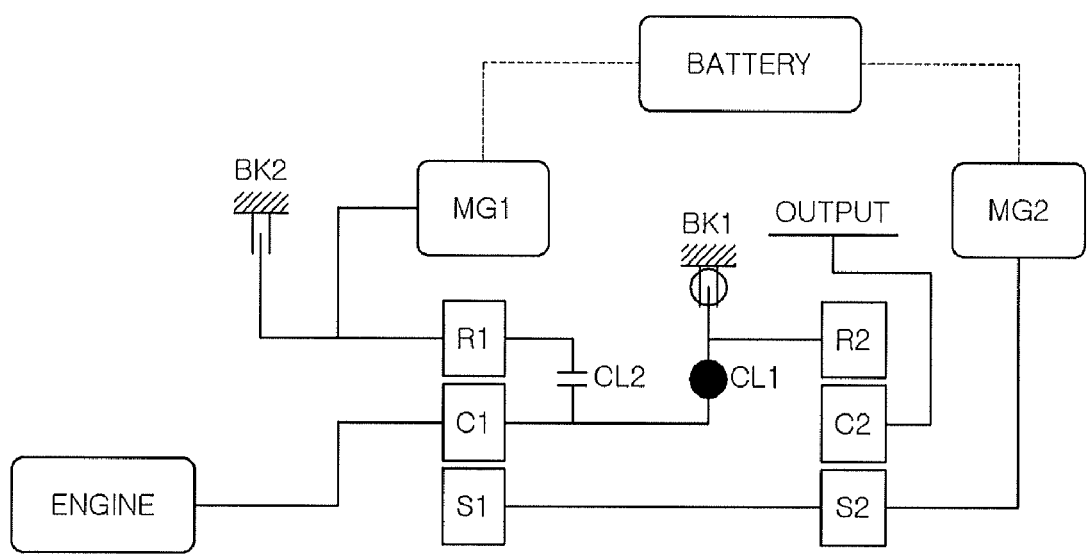
Figure 8:
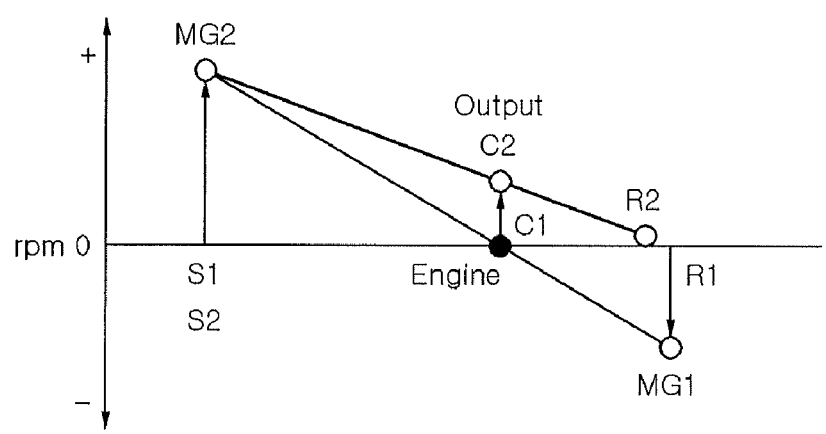

FIG. 8 shows the EV2 mode, in which the ENGINE firmly fixed by engaging both the first brake BK1 and the first clutch CL1 while the first motor generator MG1 and the second motor generator MG2 are driven. As a result, as compared with the EV1 mode, the first motor generator MG1 and the second motor generator MG2 can be more efficiently driven, thereby contributing to further improve fuel efficiency.

Figure 9:
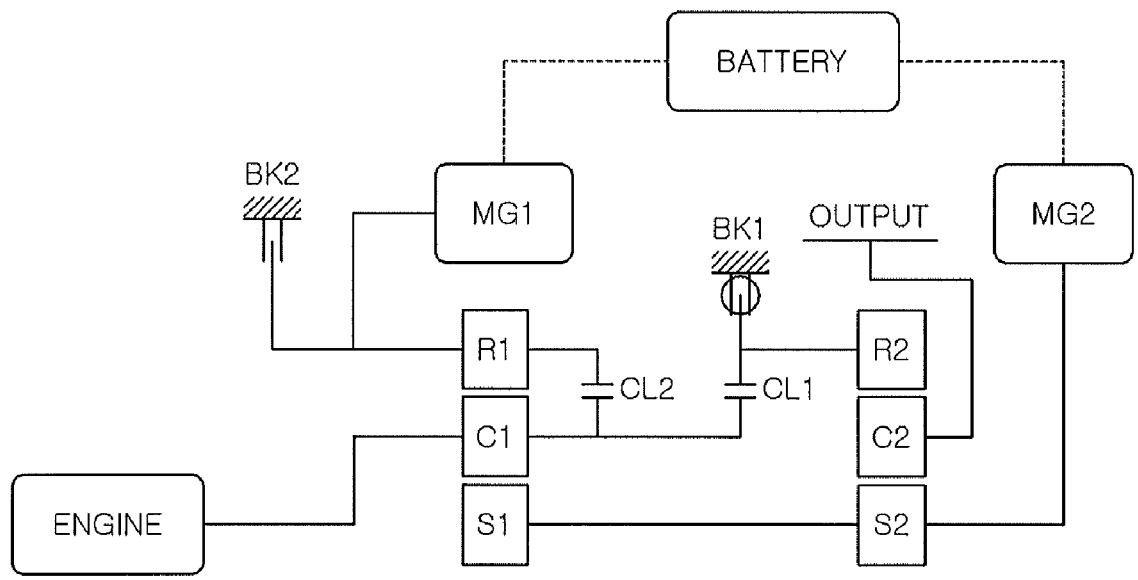
Figure 9:
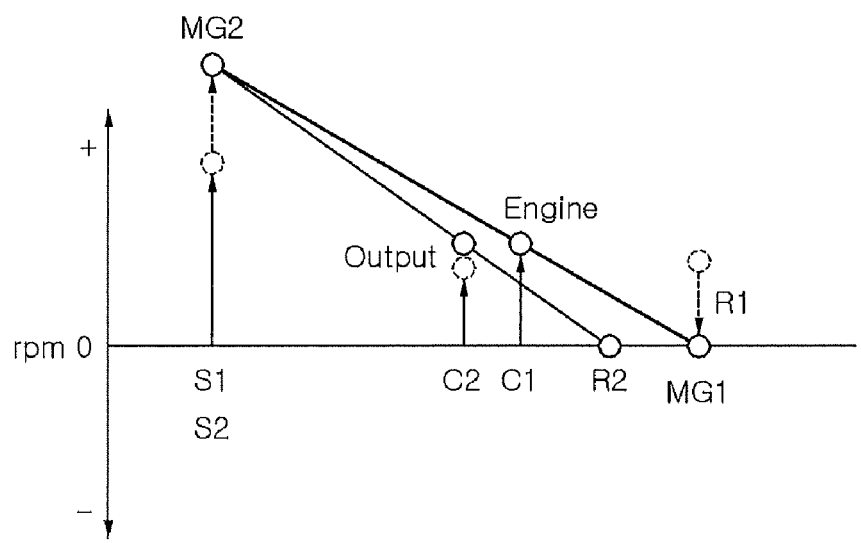

FIG. 9 shows the input split mode, in which only the first brake BK1 is engaged. IN this mode, the transmission operates as an EVT. That is, with only the first brake BK1 engaged, the power from the ENGINE and the second motor generator MG2 is used to drive the vehicle and the power from the first motor generator MG1 is used to generate electricity.

Figure 10:
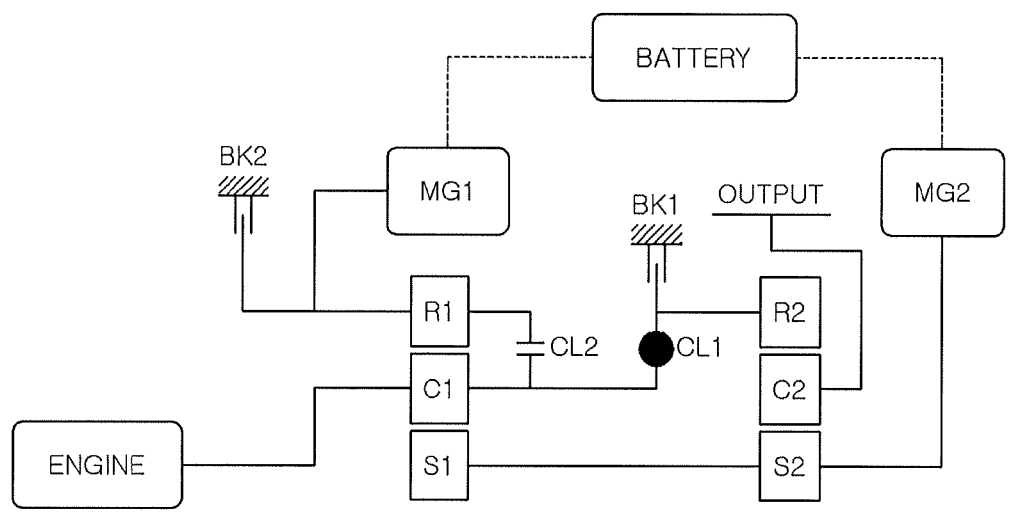
Figure 10:
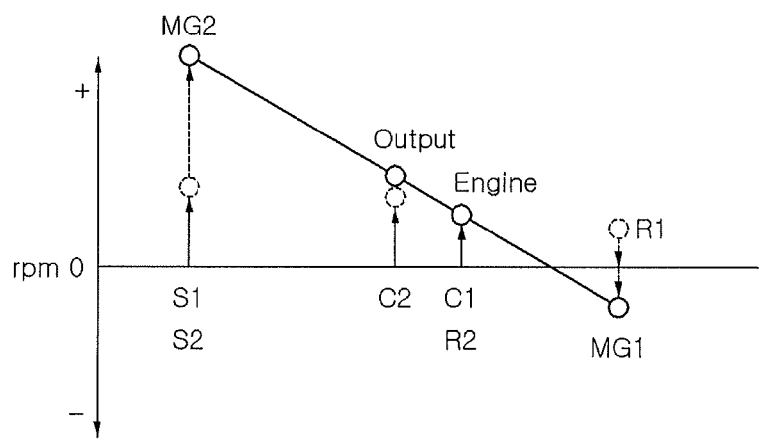

FIG. 10 shows the compound split mode in which the first clutch CL1 is engaged. In this mode, the first differential gear set 1 and the second differential gear set 3 form one lever by the first clutch CL1, as shown in the figure. Accordingly, the power from the second motor generator MG2 and the ENGINE is used to drive the vehicle and the power from the first motor generator MG1 is used to generate electricity or circulate power.

Figure 11:
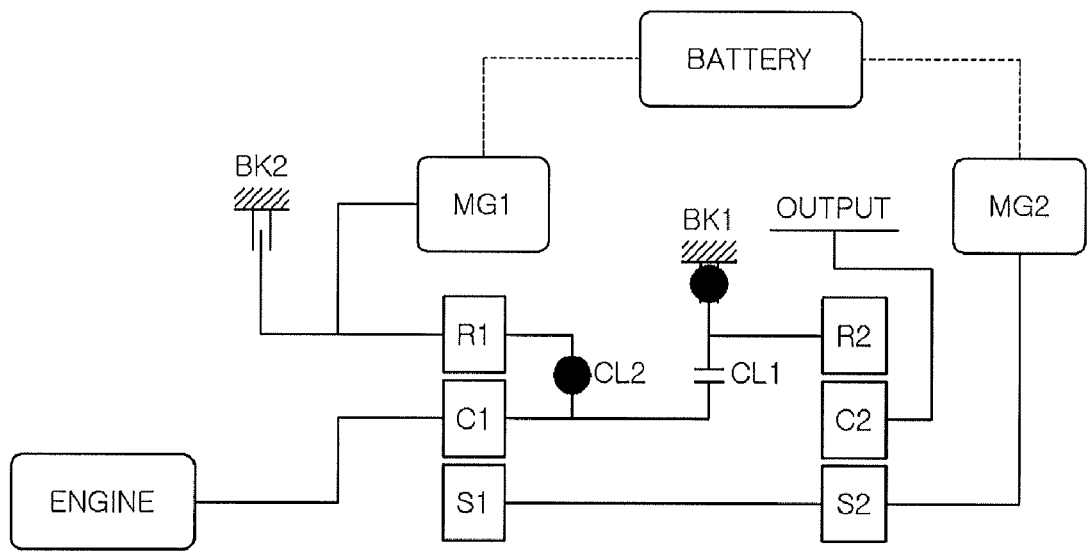
Figure 11:
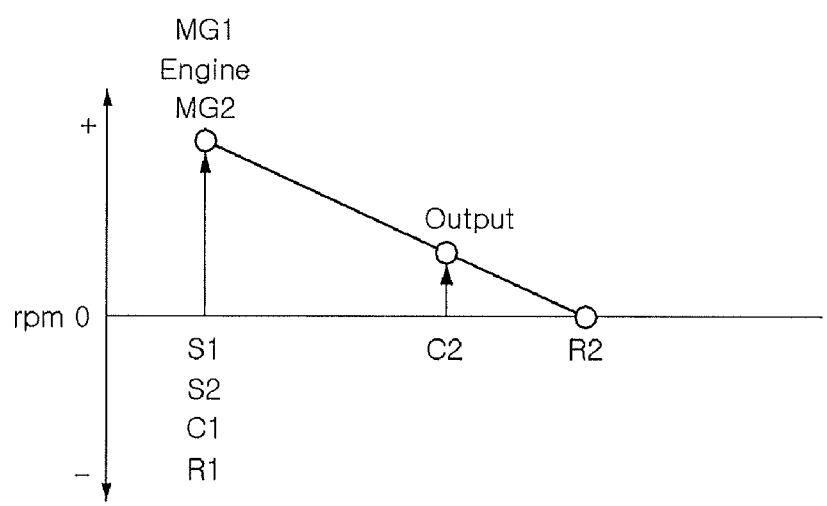

FIG. 11 shows the UD mode in which the first brake BK1 and the second clutch CL2 are engaged. Since the first differential gear set 1 becomes integrated by engagement of the second clutch CL2 and the second ring gear R2 is fixed by engagement of the first brake BK1, the power from the ENGINE is supplied to the second sun gear S2 and reduced and outputted through the second carrier C2, in which the first motor generator MG1 and the second motor generator MG2 freely rotate with the ENGINE.

Figure 12:
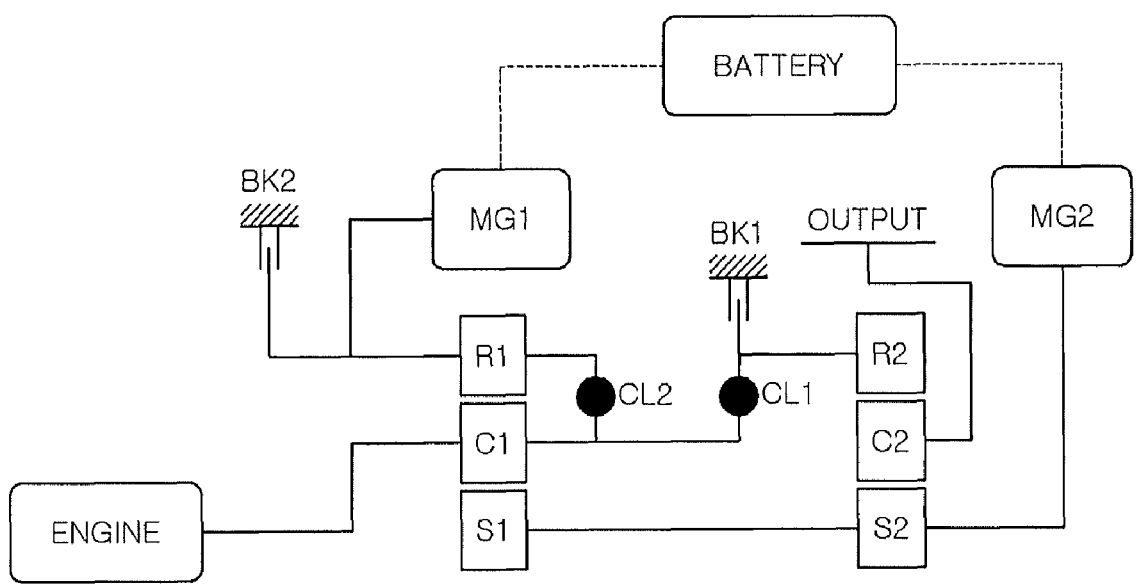
Figure 12:
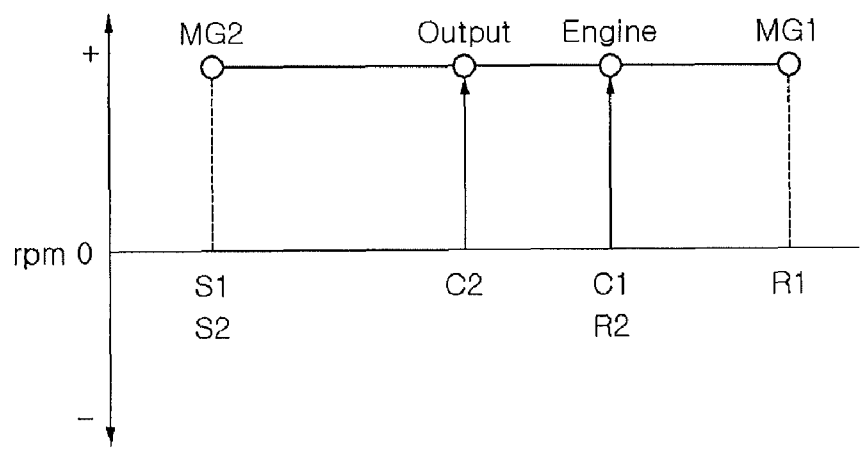

FIG. 12 shows the 1:1 transmission ratio mode in which the first clutch CL1 and the second clutch CL2 are engaged. In this mode, the first differential gear set 1 becomes integrated by the engagement of the first clutch CL1 and the second differential gear set 3 becomes integrated with the first differential gear set 1 by the engagement of the second clutch CL2, such that the power from the ENGINE is inputted to the first carrier C1 and is outputted to the OUTPUT through the second carrier C2 without a change. Further, the first motor generator MG1 and the second motor generator MG2 freely rotate with the engine ENGINE.

Figure 13:
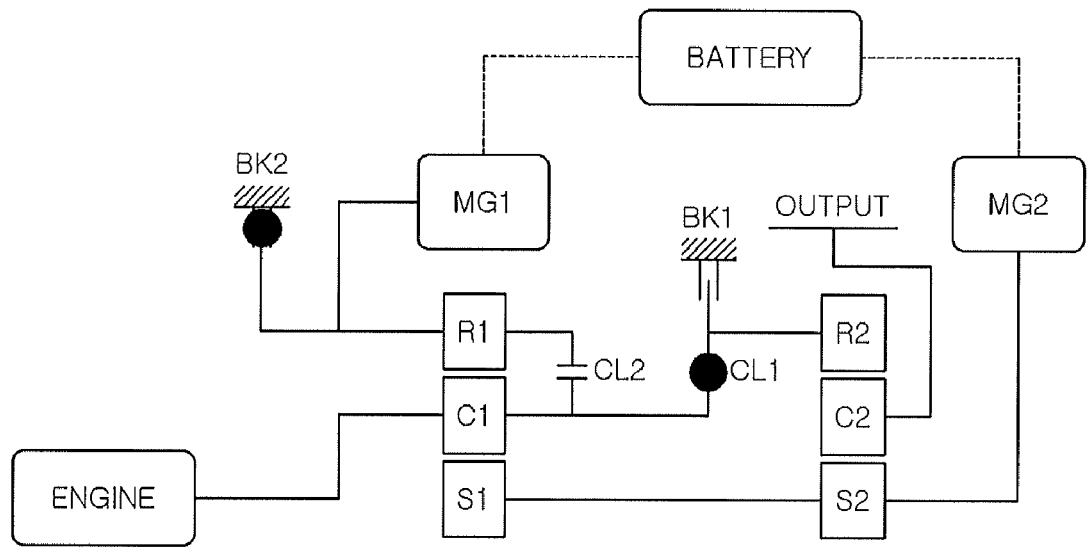
Figure 13:
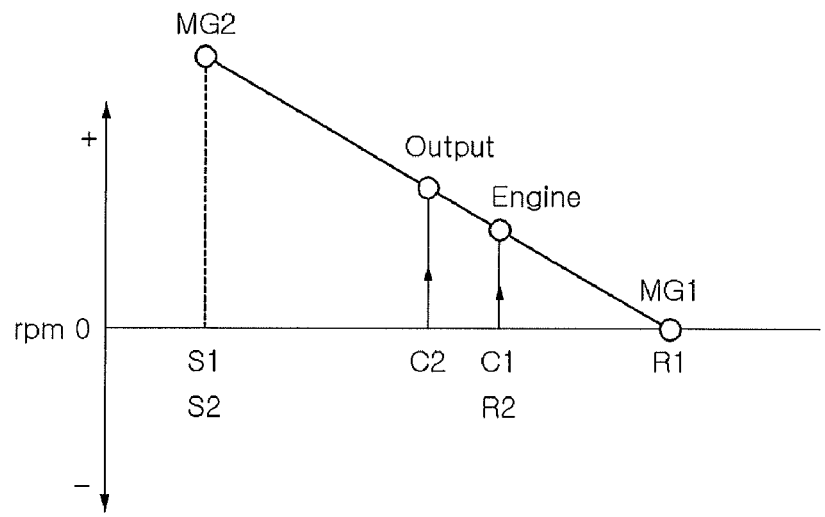

FIG. 13 shows the OD mode in which the second brake BK2 and the first clutch CL1 are engaged. In this mode, the first differential gear set 1 and the second differential gear set 3 form one lever by the engagement of the fist clutch CL1. Since the first ring gear R1 is fixed, the power supplied from the ENGINE to the first carrier C1 and the second ring gear R2 is increased across the second carrier C2 and then outputted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system for a hybrid vehicle comprising:
   a first simple planetary gear set including a first sun gear, a first carrier and a first ring gear, wherein the first carrier is connected to an engine;
   a second simple planetary gear set that includes a second sun gear, a second carrier and a second ring gear, wherein the second sun gear is continuously connected to the first sun gear;
   a first torque transmission unit selectively connecting the first simple planetary gear set to the second simple planetary gear set;
   a second torque transmission unit configured to restrict rotation to a portion of the second simple planetary gear set;
   a first motor generator continuously connected to the first ring gear;
   a second motor generator continuously connected to the second sun gear; and
   a third torque transmission unit selectively directly connecting the first carrier with the engine,
   the first torque transmission unit and a third torque transmission unit are a first clutch and a second clutch, respectively, selectively connecting/disconnecting two members that rotate with respect to each other, and
   the second torque transmission unit is a first brake restricting rotation of members connected to the second simple planetary gear set,
   the first carrier is connected to the second ring gear through the first clutch and to the engine through the second clutch,
   the first ring gear is directly connected to the first motor generator,
   the second sun gear is directly connected to the second motor generator, and
   the second carrier is directly connected to the output unit.

2. The transmission for a hybrid vehicle according to claim 1, further comprising:
   a fourth torque transmission unit selectively connecting first carrier to the first ring gear; and
   a fifth torque transmission unit configured to restrict the rotation of first ring gear.

3. The transmission for a hybrid vehicle according to claim 2, wherein the fourth torque transmission unit is a third clutch selectively connecting/disconnecting two members that rotate with respect to each other, and the fifth torque transmission unit is a second brake selectively restricting rotation of connected members.

4. The transmission for a hybrid vehicle according to claim 3, wherein the third clutch as a fifth torque transmission unit, is disposed between the first carrier and the engine to selectively connect the first carrier with the engine.

5. A transmission comprising:

a first simple planetary gear set that includes a first sun gear, a first carrier, and a first ring gear;

a second compound planetary gear set that includes a second sun gear, a second carrier, and a second ring gear, the second sun gear continuously directly connected to the first sun gear and a second motor generator;

a first clutch selectively connecting the first carrier with the second ring gear and the second carrier; and a first brake configured to restrict the rotation of the second ring gear, wherein the first ring gear is continuously directly connected to a first motor generator, the second sun gear is continuously connected to the second motor generator, the first carrier is selectively directly connected to an engine through a second clutch, the second ring gear and the second carrier are continuously directly connected to an output unit.

* * * * *